(12) United States Patent
Lin (10) Patent No.: US 10,820,754 B2
(45) Date of Patent: Nov. 3, 2020

(54) BLENDER AND PUSHING UNIT THEREOF

(71) Applicant: Tsann Kuen (Zhangzhou) Enterprise Co., Ltd., Zhangzhou (CN)

(72) Inventor: Chieh-Wen Lin, Zhangzhou (CN)

(73) Assignee: Tsann Kuen (Zhangzhou) Enterprise Co., Ltd., Zhangzhou (CN)

(*) Notice: Subject to any disclaimer, the term of this patent is extended or adjusted under 35 U.S.C. 154(b) by 363 days.

(21) Appl. No.: 15/897,421

(22) Filed: Feb. 15, 2018

(65) Prior Publication Data

US 2018/0279833 A1  Oct. 4, 2018

(30) Foreign Application Priority Data

Mar. 30, 2017  (CN) .......................... 2017 1 0200978

(51) Int. Cl.
| | |
|---|---|
| *A47J 43/07* | (2006.01) |
| *B02C 18/22* | (2006.01) |
| *B02C 18/10* | (2006.01) |
| *A47J 43/046* | (2006.01) |
| *A47J 43/042* | (2006.01) |

(52) U.S. Cl.
CPC ......... *A47J 43/0716* (2013.01); *A47J 43/042* (2013.01); *A47J 43/046* (2013.01); *B02C 18/10* (2013.01); *B02C 18/2216* (2013.01)

(58) Field of Classification Search
CPC .... A47J 43/0716; A47J 43/042; A47J 43/046; A47J 43/0722; A47J 43/0727; A47J 43/085

USPC .......... 366/205, 206, 314, 428; 99/286, 331, 99/337, 348, 353, 485, 513, 537
See application file for complete search history.

(56) References Cited

U.S. PATENT DOCUMENTS

| | | | |
|---|---|---|---|
| 6,350,053 B1 | 2/2002 | Morin | |
| 2002/0176320 A1* | 11/2002 | Wulf | A47J 43/042 366/205 |
| 2014/0247685 A1* | 9/2014 | Roberts | A47J 43/0716 366/205 |

OTHER PUBLICATIONS

Search Report appended to an Office Action, which was issued to Chinese counterpart application No. 201710200978.6 by the CNIPA dated Feb. 3, 2020 with an English translation thereof.

* cited by examiner

*Primary Examiner* — Phuong T Nguyen
(74) *Attorney, Agent, or Firm* — Burris Law, PLLC (57) ABSTRACT

A blender includes abase and a container unit mounted rotatably and detachably on the base. The container unit includes a container, and a blade assembly disposed on a bottom portion of the container. The base includes a first push portion adjacent to the blade assembly which has a second push portion. When the container unit is rotated relative to the base until the second push portion contacts with the first push portion, the first push portion pushes upward the second push portion as the container unit is continuously rotated relative to the base so as to move the container unit upwardly and away from the base.

9 Claims, 10 Drawing Sheets

BLENDER AND PUSHING UNIT THEREOF

CROSS-REFERENCE TO RELATED APPLICATION

This application claims priority to Chinese Patent Application No. 201710200978.6, filed on Mar. 30, 2017.

FIELD

The disclosure relates to a blender, more particularly to a blender that can cut, crush and blend fruits and other foods and a pushing unit thereof.

BACKGROUND

A conventional blender includes a base having a motor, and a container unit detachably mounted on the base. The container unit includes a container for containing fruit, and a blade assembly including a blade holder threadedly connected to a bottom portion of the container, and a plurality of blades disposed on the blade holder and driven to rotate by the motor.

In use, the container is rotated relative to the base so as to threadedly connect with the same, and the motor is activated to rotate the blades for cutting, crushing and blending the fruits placed in the container. After the cutting, crushing and blending process is completed, the container is rotated in a reverse direction to separate the container unit from the base. However, when the user further rotates the container when it already reaches a removable position, an excessive rotation of the container occurs. At this time, because the blade assembly is blocked by a blocking structure of the base and cannot further rotate, the blade assembly is likely to separate from the continuously rotated container, so that the processed food in the container will flow out from a bottom portion of the container toward the base. In view of this, there is still room for improvement in the design of the conventional blender.

SUMMARY

Therefore, an object of the present disclosure is to provide a blender that is capable of overcoming the aforesaid drawback of the prior art and that has a pushing unit.

According to one aspect of this disclosure, a blender includes a base and a container unit mounted rotatably and detachably on the base. The container unit includes a container, and a blade assembly disposed on a bottom portion of the container. The base includes a first push portion adjacent to the blade assembly. The blade assembly includes a second push portion. When the container unit is rotated relative to the base until the second push portion contacts with the first push portion, the first push portion pushes upward the second push portion as the container unit is continuously rotated relative to the base so as to move the container unit upwardly and away from the base.

According to another aspect of this disclosure, a pushing unit of a blender, which includes a base and a container unit detachably mounted on the base, is configured to be disposed on at least one of the base and the container unit and is configured to push the container unit so as to move the container unit upward relative to the base when the container unit is rotated relative to the base.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the present disclosure is described in greater detail with reference to the accompanying embodiments, it should be noted herein that like elements are denoted by the same reference numerals throughout the disclosure.

Figure 1:
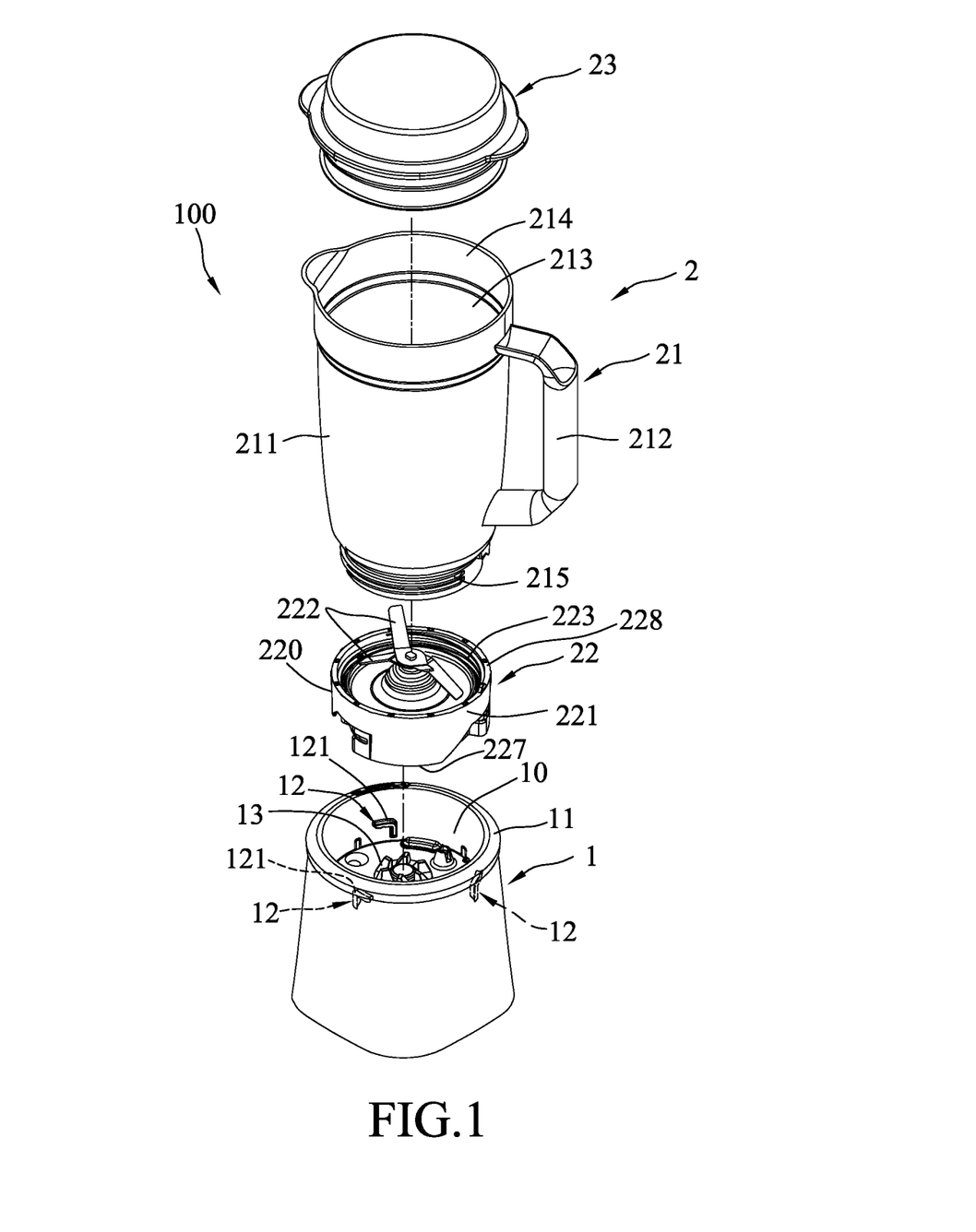
FIG. 1 is an exploded perspective view of a blender according to the first embodiment of this disclosure.
Figure 2:
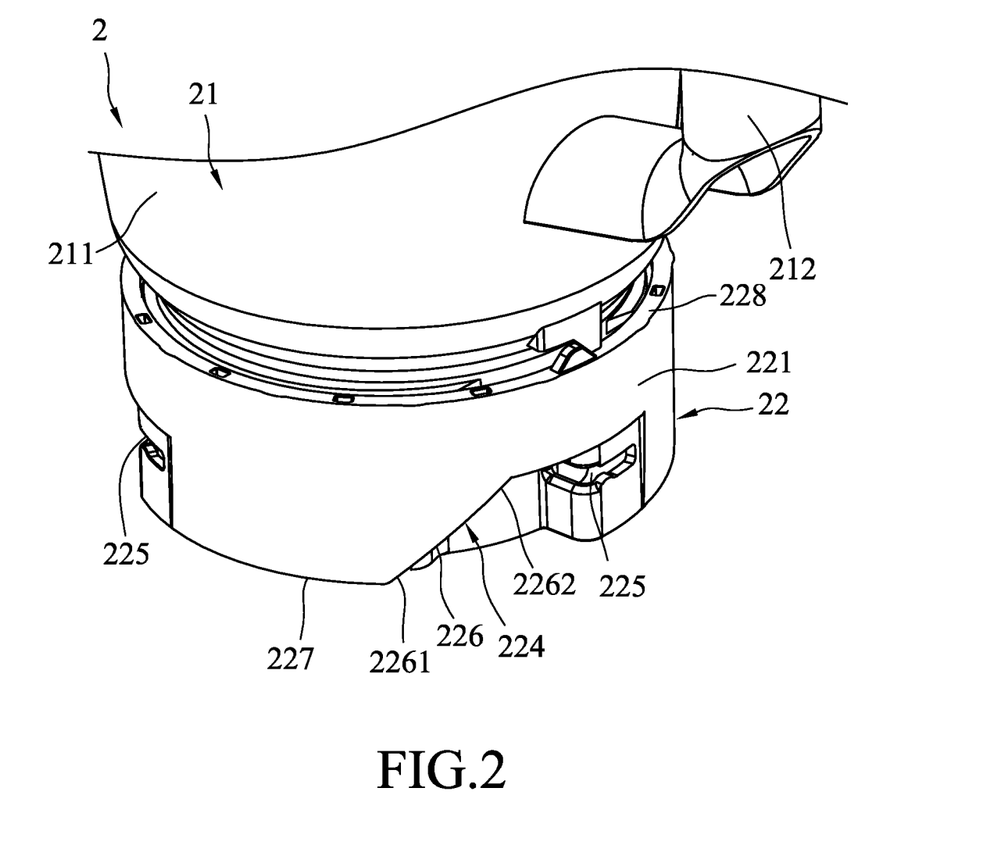
FIG. 2 is a fragmentary perspective view of a container unit of the first embodiment.
Figure 3:
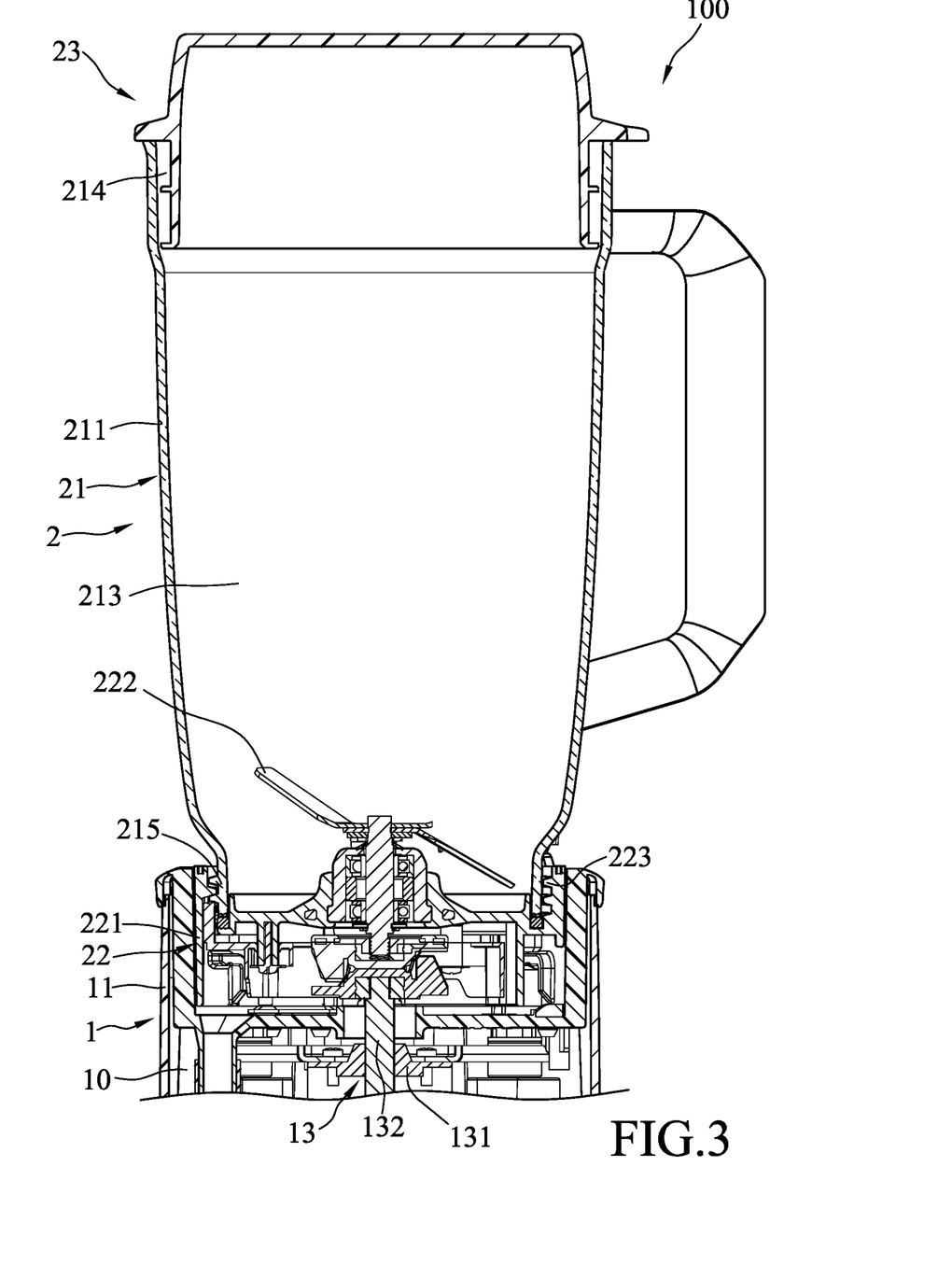
FIG. 3 is a sectional view of the first embodiment in an assembled state.

Referring to FIGS. 1 to 3, a blender 100 according to the first embodiment of the present disclosure is shown to include a base 1 and a container unit 2.

The base 1 includes a base surrounding wall 11 defining a base space 10, three equidistantly spaced-apart first push portions 12 proximate to an upper end of the base surrounding wall 11, and a power mechanism 13 located within the base surrounding wall 11 and including a motor 131 having a motor shaft 132. Each of the first push portions 12 protrudes from an inner peripheral surface of the base surrounding wall 11. In this embodiment, each first push portion 12 has an inverted L-shape, and has a first push surface 121 that is a curved surface.

The container unit 2 is mounted rotatably and detachably on the base 1, and includes a container 21, a blade assembly 22, and a cover 23. The container 21 includes a container surrounding wall 211, and a handle 212 protruding outwardly from one side of the container surrounding wall 211. The container surrounding wall 211 defines a receiving space 213 having an upper opening 214, and has a first threaded portion 215 formed on a bottom portion thereof.

The blade assembly 22 is disposed on a bottom portion of the container 21, and includes a blade holder 220 and a plurality of angularly spaced-apart blades 222. The blade holder 220 includes a blade holder surrounding wall 221 having a lower end 227 and an upper end 228, a second threaded portion 223 formed in an inner peripheral surface of the blade holder surrounding wall 221 in proximity to the upper end 228 for threaded engagement with the first threaded portion 215, three second push portions 224 formed on the lower end 227 and equiangularly spaced apart from each other, and three engaging slots 225 formed inwardly of the second push portions 224, respectively.

In this embodiment, each of the second push portions 224 is configured as a notch formed in the lower end 227 of the blade holder surrounding wall 221, and has a generally trapezoidal shape. Each second push portion 224 has a second push surface 226 facing the first push surface 121 of the respective first push portion 12 so as to be pushed by the same. The second push surface 226 has a lower end 2261 adjacent to the lower end 227 of the blade holder surrounding wall 221, and an upper end 2262 proximate to the upper end 228 of the blade holder surrounding wall 221. In this embodiment, the second push surface 226 is an oblique flat surface that extends obliquely from the lower end 2261 to the upper end 2262 thereof. Each of the engaging slots 225 is spaced apart from and opposite to the second push surface 226 of a respective one of the second push portions 224.

The blades 222 are connected to the motor shaft 132 to rotate together with the same when the motor 131 is activated for crushing and blending the food to be processed.

The cover 23 removably covers a top end of the container surrounding wall 211 to close the upper opening 214 of the receiving space 213.

Figure 4:
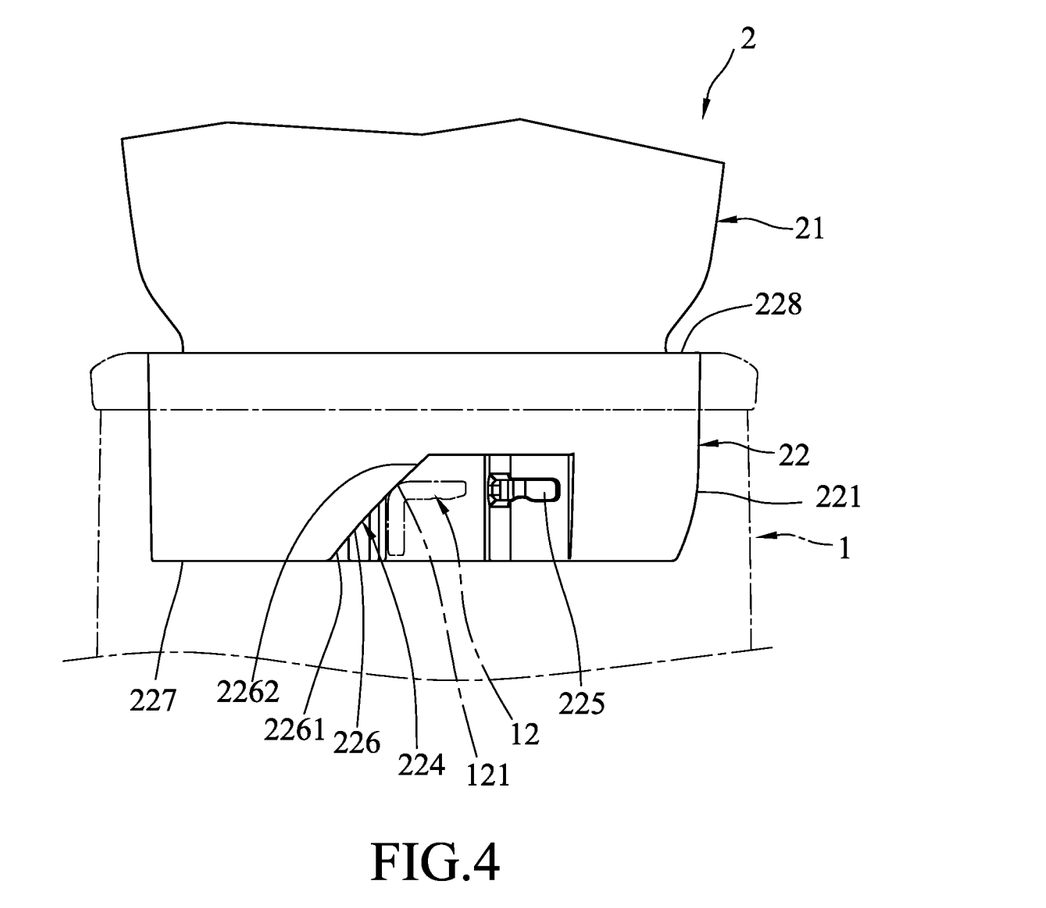
FIG. 4 is a fragmentary perspective view of the first embodiment, illustrating a relationship between a first push portion of a base and a second push portion and an engaging slot of the container unit.
Figure 5:
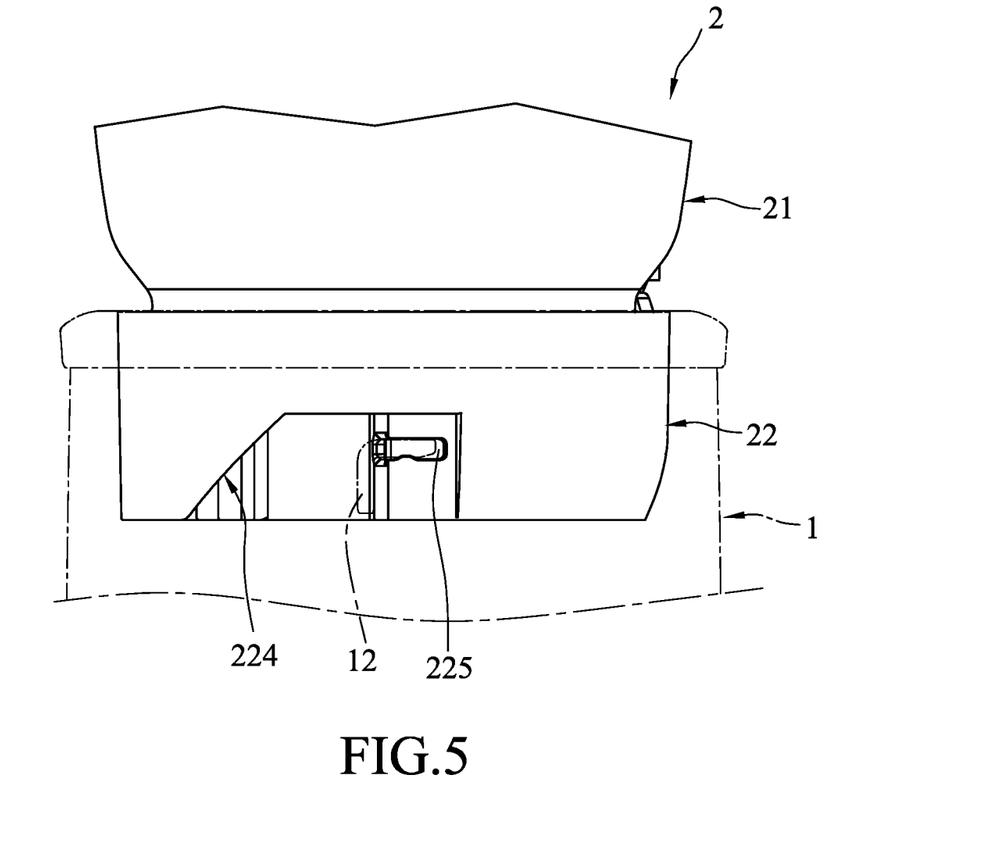
FIG. 5 is a view similar to FIG. 4, but illustrating the first push portion engaged to the engaging slot.

Referring to FIGS. 4 and 5, in combination with FIG. 1, to use this embodiment, the blade assembly 22 is first assembled with the container 22 to form the container unit 2, after which the container unit 2 is assembled with the base 1. To assemble the container unit 2 with the base 1, the bottom portion of the blade assembly 22 is first inserted into the base space 10. At this time, each first push portion 12 is located between one of the second push portions 224 and a corresponding one of the engaging slots 225 (see FIG. 4). Next, the container unit 2 is rotated clockwise relative to the base 1 so as to gradually move close each engaging slot 225 to a respective one of the first push portions 12 until each first push portion 12 extends into and engages the respective engaging slot 225 (see FIG. 5), thereby completing the assembly of the container unit 2 and the base 1. At this time, the power mechanism 13 is connected to the blades 222 through the motor shaft 132. The cover 23 can then be opened to place the food to be processed into the receiving space 213. After the food to be processed is placed in the receiving space 213, the cover 23 is closed, and the power mechanism 13 is activated to drive rotation of the blades 222 so as to crush and blend the food to be processed.

Figure 6:
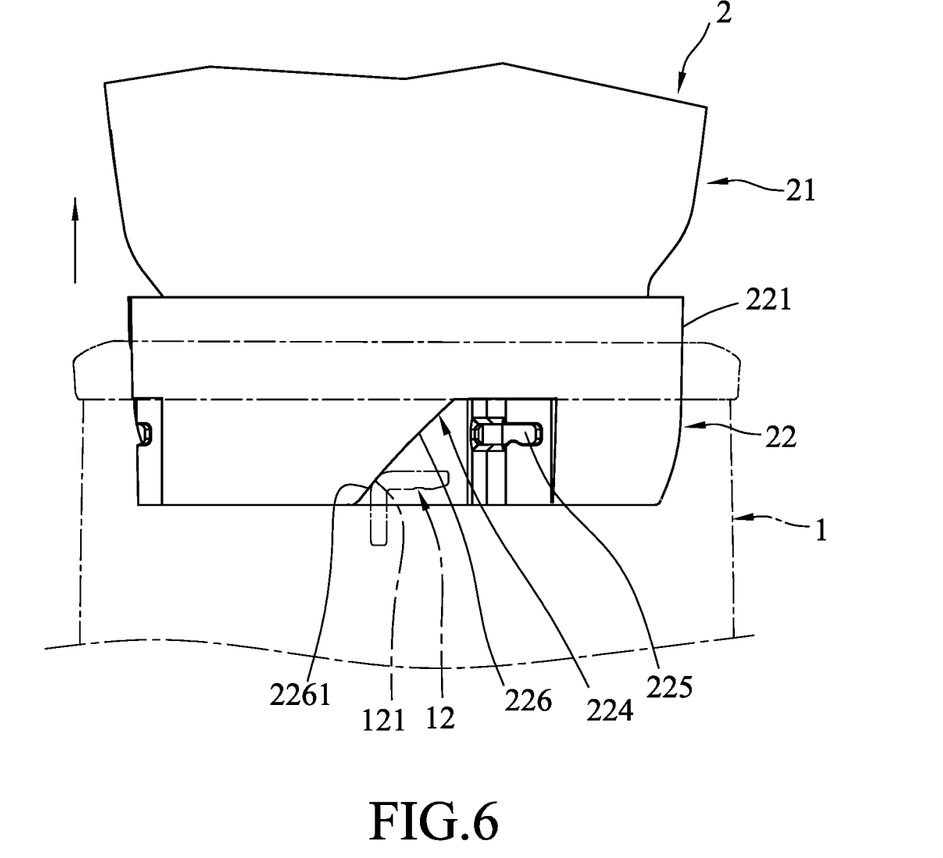
FIG. 6 is a view similar to FIG. 4, but illustrating a first push surface of the first push portion in contact with a lower end of a second push surface of the second push portion.

Referring to FIG. 6, in combination with FIGS. 4 and 5, to remove the container unit 2 from the base 1, the container unit 2 is rotated counterclockwise relative to the base 1 to disengage each first push portion from the respective engaging slot 225 and to move the second push surface 226 of each second push portion 224 into contact with the first push surface 121 of the respective first push portion 12 (see FIG. 4). As the container unit 2 is continuously rotated, the second push surface 226 of each second push portion 224 is pushed by the first push surface 121 of the respective first push portion 12 to move upward until the first push surface 121 is located at the lower end 2261 of the second push surface 2261 (see FIG. 6). During this process, the first push surface 121 moves along the second push surface 226 and pushes the same from the upper end 2262 to the lower end 2261 thereof so as to move upward the container unit 2 relative to the base 1, thereby removing the container unit 2 from the base 1. Hence, during rotation of the container unit 2, the container unit 2 can automatically move upward and away from the base 1, so that the removal thereof is simple and smooth.

It should be noted herein that, in this embodiment, three first push portions 12 are provided to cooperate with the second push portions 224. However, in practice, the number of each of the first and second push portions 12, 224 may be one, two or more, and is not limited to what is disclosed herein. Similarly, only one engaging slot 225 may be provided to receive and engage one first push portion 12, but is not limited thereto. Each of the first and second push surfaces 121, 226 may be a curved or flat surface. The curved surface may be a circular curved surface, a parabolic curve surface, or other curved surfaces, and may be a curved convex or concave surface. The flat surface may be an oblique flat surface.

Further, the second push portion 224 of this embodiment is configured as a notch that extends upwardly from the lower end 227 of the blade holder surrounding wall 221 and that has the second push surface 226. However, in practice, the second push portion 224 may be a protrusion protruding downwardly from the lower end 227 of the blade holder surrounding wall 221 or protruding radially from an outer peripheral surface of the blade holder surrounding wall 221 which can similarly be moved into contact with the first push portion 12. Thus, the structure of each of the first and second push surfaces 121, 226 is not limited to what is disclosed herein, as long as the first push surface 121 can push upward the second push surface 226 so as to raise and remove the container unit 2 from the base 1, any structure thereof is acceptable, and is within the spirit of this disclosure.

Moreover, the spirit of this disclosure is to provide a pushing unit on at least one of the base 1 and the container unit 2. When the container unit 2 rotates relative to the base 1, the pushing unit can push the container unit 2 to move upward relative to the base 1. In this embodiment, the pushing unit includes one of the first push portions 12 and one of the second push portions 224 that can contact and push each other. As such, this embodiment is equivalent to having three pushing units.

In summary, through the provision of the first and second push portions 12, 224, to remove the container unit 2 from the base 1, the container unit 2 is simply rotated counterclockwise relative to the base 1 until the second push surface 226 of each second push portion 224 is moved into contact with the first push surface 121 of the respective first push portion 12 so as to be pushed by the same and so as to move the container unit 2 upwardly and away from the base 1. Hence, the removal of the container unit 2 from the base 1 is very smooth and simple. By virtue of the structures of the first and second push portions 12, 224 that block each other and that push against each other, the container unit 2 cannot be excessively rotated to cause releasable engagement between the container 21 and the blade holder 220, so that the problem of the processed food flowing out of the bottom portion of the container encountered in the prior art can be resolved.

Figure 7:
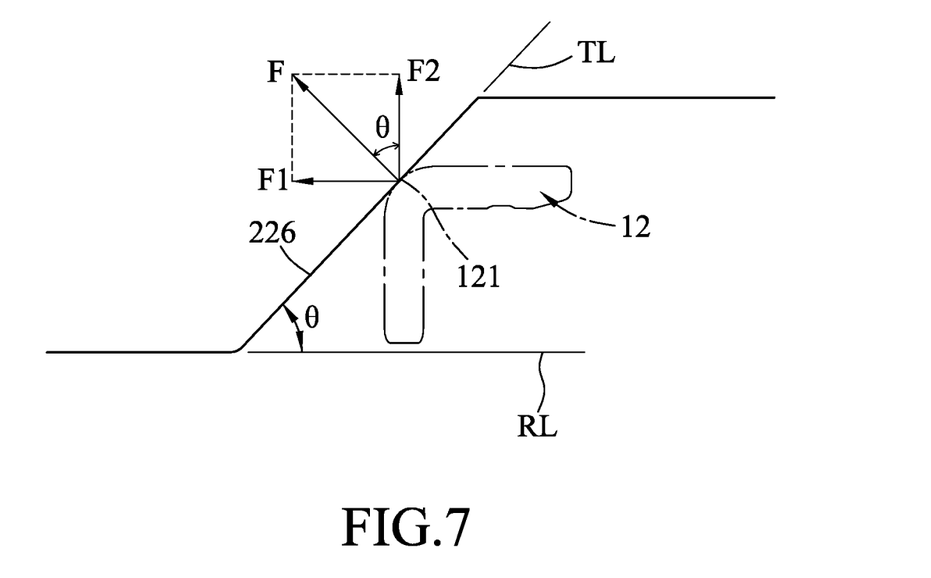
FIG. 7 illustrates the second push surface being an oblique flat surface and a tangent line passing through a contact point of the first push surface and the second push surface.

FIG. 7 illustrates a preferred angular design of the second push surface 226. A normal force (F) is defined as a pushing force of the first push surface 121 on the second push surface 226, and is divided into a horizontal component (F1) and a vertical component (F2), where $F2 = F \cdot \cos \theta$. The angle $\theta$ is defined as an acute angle between a tangent line (TL), which passes through a contact point of the second push surface 226 and the first push surface 121, and a horizontal reference line (RL). The angle $\theta$ is also equivalent to an acute angle between the second push surface 226 and the horizontal reference line (RL). Preferably, θ≤45° so as to produce a large vertical component (F2), so that F2≥F1, and the effect of pushing upward the container unit 2 is good. More preferably, the acute angle θ is defined as 25°≤θ≤45°. The acute angle θ is limited to being less than or equal to 25° to consider the strength of the structure and to allow appropriate rotation of the container unit 2, so that after rotating for a certain distance, the second push surface 226 can be pushed upward to a sufficient height to achieve the purpose of removing the container unit 2 from the base 1. Otherwise, if the angle θ is too small, which means that the inclination of the second push surface 226 is small, the container unit 2 must be rotated for a longer distance to reach a sufficient height for removal from the base 1, so that removal of the container unit 2 from the base 1 is inconvenient.

Figure 8:
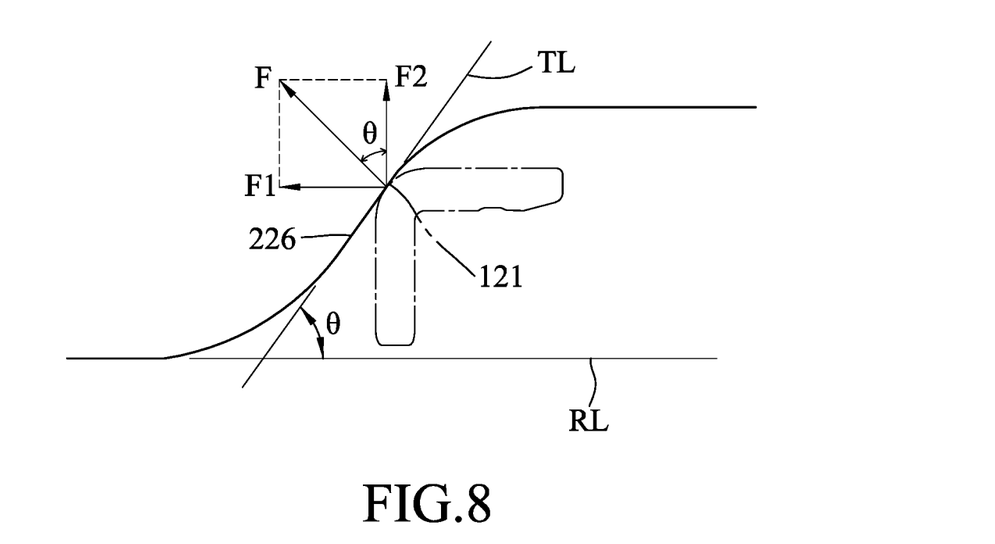
FIG. 8 is a view similar to FIG. 7, but illustrating the second push surface being a curved surface.

FIG. 8 illustrates the position of the angle θ when the second push surface 226 is a curved surface, and the angle θ is defined by a tangent line (TL), which passes through a contact point of the second push surface 226 and the first push surface 121, and a horizontal reference line (RL). Preferably, the angle θ is less than or equal to 45° to achieve a better upward pushing effect. More preferably, 25°≤θ≤45°. The advantages of this angular range are similar to those described above.

Figure 9:
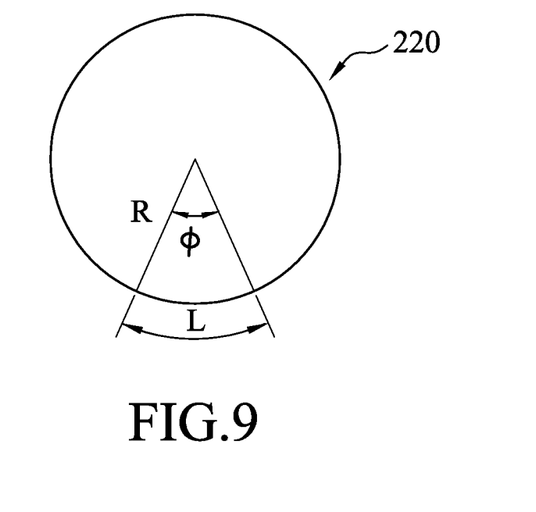
FIG. 9 is a schematic view of an outer periphery of a blade holder of a blade assembly of the container unit of the first embodiment.

Further, schematic and mathematical formulas are used to explain how the lower limit of 25° of the angle θ is obtained. Referring to FIG. 9, which is a schematic view of an outer periphery of the blade holder 220, in combination with FIG. 4, the radius of the blade holder surrounding wall 221 is R, the arc corresponding to the central angle (φ) has a length (L), the angle is in radians, and Formula 1 can be obtained.

$$L = R \times \phi \qquad \text{Formula 1}$$

Figure 10:
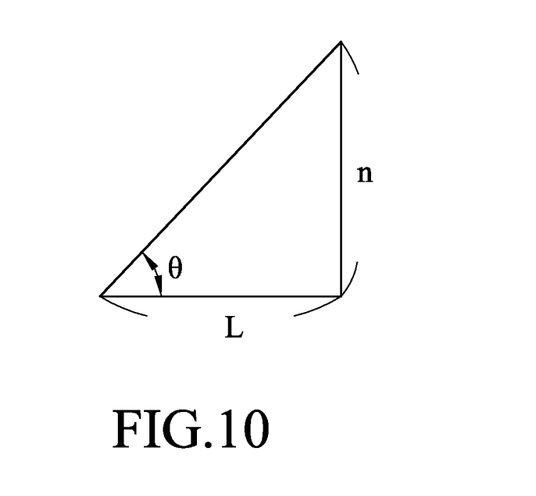
FIG. 10 illustrates a relation between a height in which the container unit can be lifted and an angle of the second push surface.

Referring to FIG. 10, which illustrates a right triangular pattern representing a relation between a height in which the container unit 2 can be raised (which is equivalent to a raising height of the second contact portion 224) and the angle θ (discussed in FIGS. 7 and 8), in combination with FIG. 4, n represents the height that the container unit 2 can be raised, and L represents the length of the arc mentioned above but is straightened. From the right triangular pattern of FIG. 10 and Formula 1, the below formula, i.e., Formula 2, can be obtained.

$$L = \frac{n}{\tan\theta} = R \times \phi \qquad \text{Formula 2}$$
$$\text{therefore, } \phi = \frac{n}{R} \times \frac{1}{\tan\theta}$$

In this embodiment, n/R can be equal to ½ or ⅝, which is represented below.

n/R=½ Case 1
n/R=⅝ Case 2

In addition, during the implementation of this disclosure, it is preferable to provide three of the aforesaid second push portions 224. Since the second push portion 224 is configured as a notch that extends upwardly from the lower end 227 of the blade holder surrounding wall 221, and the second push surface 226 and the engaging slot 225 are located in the notched area, if there are too many second push portions 224, the structural strength of the blade holder 220 may be weakened. Thus, the number of the second push portion 224 of this embodiment is three, which is appropriate and which can ensure a good structural strength of the blade holder 220. By dividing the circumference of the blade holder 220 into six equal parts, three of which are provided with the second push portions 224, while the other three of which are not provided with the second push portions 224. It should be noted herein that, the six equal parts are merely rough estimates because the parts having the second push portions 224 do not necessarily occupy same circumferential angles as the parts without the second push portions 224.

From the foregoing, with the six equal parts as an example, it can be roughly estimated that φ≤π/3, and by substituting it to Formula 2, Formula 3 is obtained.

$$\frac{n}{R} \times \frac{1}{\tan\theta} \leq \frac{\pi}{3} \qquad \text{Formula 3}$$

By substituting Case 1 (n/R=½) into Formula 3, the value of the angle θ can be obtained.

tan θ3/2π=0.477

Therefore, the angle θ is at least about 25° or 26°, that is, tan 25°<0.477<tan 26°. Since the six equal parts have been roughly estimated as described above, the lower limit of the angle θ can be directly limited to 25° in this embodiment.

By substituting Case 2 (n/R=⅝) into Formula 3, the value of the angle θ can be obtained.

tan θ≥15/8π=0.6

In this case, the angle θ is at least about 30° or 31°, that is, tan 30°<0.6<tan 31°.

After taking into consideration Case 1 and Case 2, it is preferred that the angle θ is less than or equal to 25°. As such, the structural strength of the blade assembly 22 is considered, and the distance rotated by the container unit 2 to remove from the base 1 is appropriate.

Figure 11:
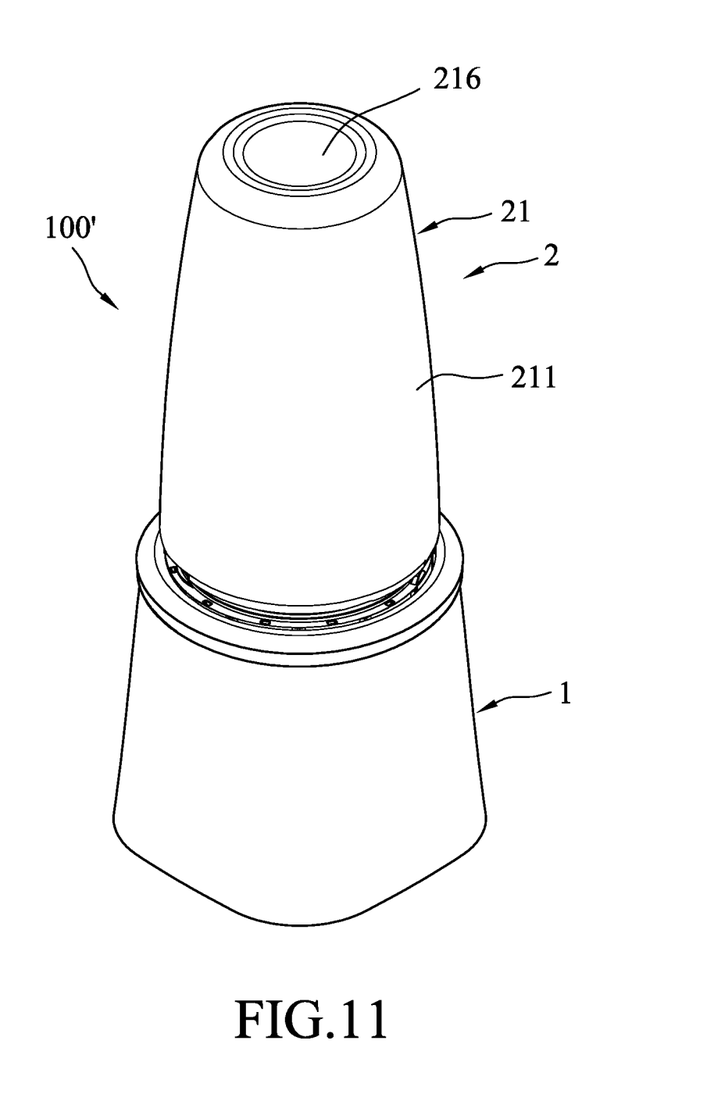
FIG. 11 is a perspective view of a blender according to the second embodiment of this disclosure.
Figure 12:
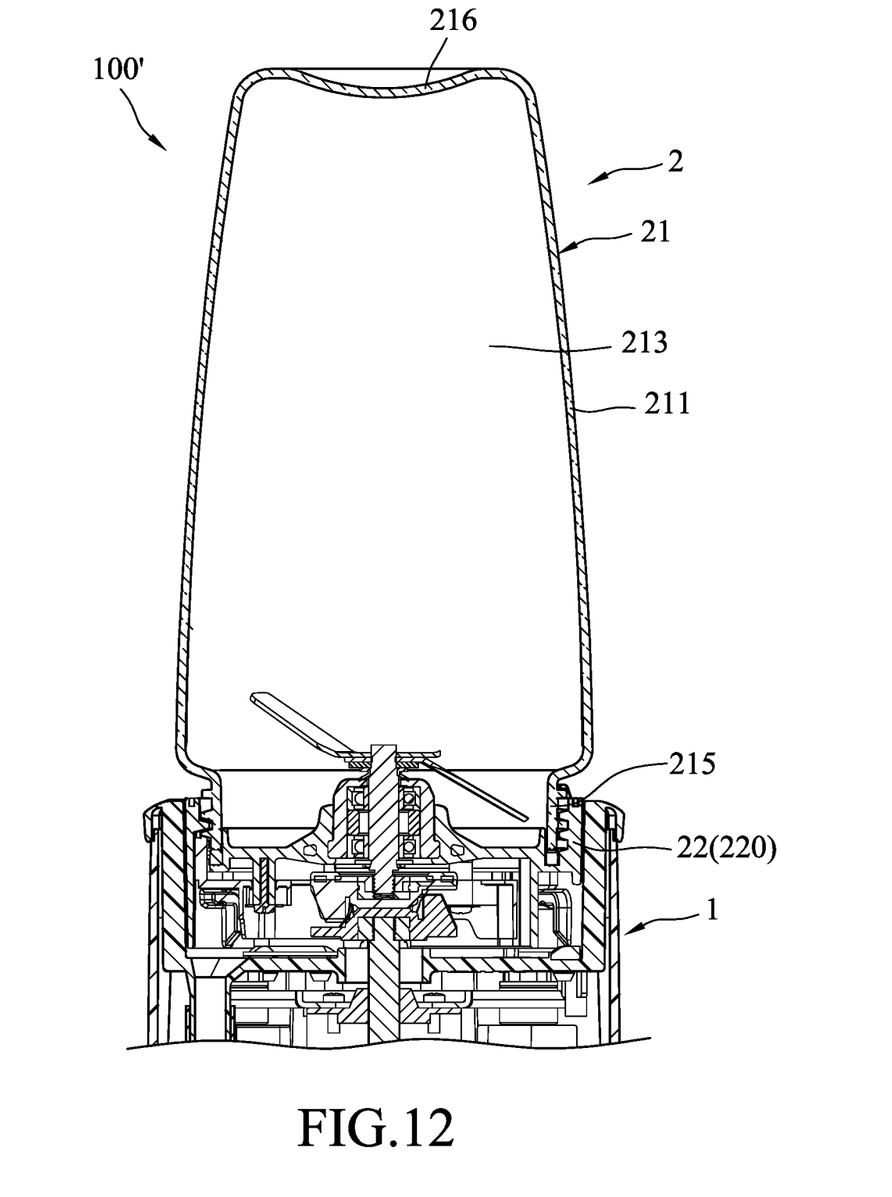
FIG. 12 is a sectional view of the second embodiment.

Referring to FIGS. 11 and 12, the second embodiment of the blender 100' of this disclosure is substantially similar to that of the first embodiment, and differs in the structure of the container unit 2. In this embodiment, the cover 23 (see FIG. 1) of the first embodiment is omitted, and the container 21 is a portable container. The container 21 further includes an end wall 216 integrally connected to a top end of the container surrounding wall 211 and cooperating with the same to define the receiving space 213.

In use, the container 21 is first disposed upside down such that the end wall 216 is at the bottom side of the container 21, and the opening of the receiving space 213 faces upward. Next, fruits or other foods to be crushed and blended are placed in the receiving space 213, and water, milk or other liquid drinks or seasoning is poured therein. The blade holder 220 of the blade assembly 22 is then threadedly connected to the container surrounding wall 211, after which the container 21 is inverted so that the blade holder 220 is located at the bottom side of the container 21. The container unit 2 is then rotatably mounted on the base 1.

This embodiment also has the first push portions 12 (see FIG. 4), the second push portions 224 (see FIG. 4) and the engaging slots 225 (see FIG. 4). The assembly method of this embodiment is thus similar to that described in the first embodiment. After using the blender 100', the container unit 2 is also detached from the base 1 in the same manner as the first embodiment, that is, the container unit 2 is rotated to move upward and away from the base 1, thereby achieving the same effect as that of the first embodiment. After removal of the container unit 2 from the base 1, the container unit 2 is placed upside down such that the end wall 216 is located on top thereof, and the blade assembly 22 is then detached from the container 21. At this time, the opening of the receiving space 213 faces upward. A lid (not shown) may be screwed with the first threaded portion 215 of the container 21. Hence, the container 21 becomes a portable container that can be carried by the user wherever he/she goes.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A blender comprising:
    a base including a base surrounding wall defining a base space, and a first push portion protruding from an inner peripheral surface of said base surrounding wall and having a first push surface that is an oblique flat surface or a curved surface; and
    a container unit mounted rotatably and detachably on said base, said container unit including a container, and a blade assembly disposed on a bottom portion of said container:
    said first push portion being adjacent to said blade assembly;
    said blade assembly including a blade holder having a blade holder surrounding wall, a plurality of blades disposed on said blade holder and surrounded by said blade holder surrounding wall, and a second push portion formed on a lower end of said blade holder surrounding wall and having a second push surface facing said first push surface, said second push surface having a lower end and an upper end, said second push surface extending from said lower end to said upper end thereof; and
    when said container unit is rotated relative to said base until said second push portion contacts with said first push portion so as to detach from said base, said second push surface is moved into contact with said first push surface such that said first push surface moves along and pushes said second push surface from said upper end to said lower end thereof, and said first push portion pushes upward said second push portion as said container unit is continuously rotated relative to said base so as to move said container unit upwardly and away from said base;
    wherein said container includes a container surrounding wall having a first threaded portion at a bottom portion thereof, and said blade assembly further includes a second threaded portion for connection with said first threaded portion.

2. The blender as claimed in claim 1, wherein said container surrounding wall defines a receiving space having an upper opening, and said container unit further includes a cover for removably covering a top end of said container surrounding wall.

3. The blender as claimed in claim 1, wherein said container further includes an end wall integrally connected to a top end of said container surrounding wall and cooperating with said container surrounding wall to define a receiving space.

4. The blender as claimed in claim 1, wherein said blade assembly further includes an engaging slot spaced apart from and opposite to said second push surface of said second push portion for engagement with said first push portion.

5. The blender as claimed in claim 1, wherein a tangent line (TL) passing through a contact point of said second push surface and said first push surface forms an acute angle ($\theta$) with respect to a horizontal reference line (RL), and said acute angle ($\theta$) is less than or equal to 45°.

6. The blender as claimed in claim 5, wherein said acute angle ($\theta$) is defined as $25° \leq \theta \leq 45°$).

7. A pushing unit of a blender, the blender including a base and a container unit detachably mounted on the base, said pushing unit being configured to be disposed on at least one of the base and the container unit and being configured to push the container unit so as to move the container unit upward relative to the base when the container unit is rotated relative to the base;
    wherein said pushing unit includes a first push portion formed on the base, and a second push portion formed on the container unit and pushed by said first push portion, said first push portion having a first push surface that is an oblique flat surface or a curved surface;
    wherein said second push portion has a second push surface, said second push surface having a lower end and an upper end, said second push surface extending from said lower end to said upper end; and
    wherein, when the container unit is rotated relative to the base to detach from the base, said second push surface is moved into contact with said first push surface such that said first push surface move along and push said second push surface from said upper end to said lower end.

8. The pushing unit as claimed in claim 7, wherein a tangent line (TL) passing through a contact point of said second push surface and said first push surface forms an acute angle ($\theta$) with respect to a horizontal reference line (RL), and said acute angle ($\theta$) is less than or equal to 45°.

9. The pushing unit as claimed in claim 8, wherein said acute angle ($\theta$) is defined as $25° \leq \theta \leq 45°$.

* * * * *